US012570224B2

(12) United States Patent
Lipp et al.

(10) Patent No.: US 12,570,224 B2
(45) Date of Patent: Mar. 10, 2026

(54) VEHICLE WIRE SHIELD ASSEMBLY

(71) Applicant: Ford Global Technologies, LLC,
Dearborn, MI (US)

(72) Inventors: Douglas Christian Lipp, Ann Arbor,
MI (US); Joseph Prior, Detroit, MI
(US); Joshua Robert Hemphill, White
Lake, MI (US); **Raul Ezequiel Alvarez
Ruiz, Estado de Mexico (MX); Michael
Shawn Watterworth**, Brighton, MI
(US)

(73) Assignee: Ford Global Technologies, LLC,
Dearborn, MI (US)

( * ) Notice: Subject to any disclaimer, the term of this
patent is extended or adjusted under 35
U.S.C. 154(b) by 391 days.

(21) Appl. No.: 18/338,505

(22) Filed: Jun. 21, 2023

(65) Prior Publication Data
US 2024/0425000 A1    Dec. 26, 2024

(51) Int. Cl.
| | |
|---|---|
| *B62D 33/03* | (2006.01) |
| *B60J 5/10* | (2006.01) |
| *B60R 16/02* | (2006.01) |
| *B62D 33/027* | (2006.01) |
| *E05D 5/06* | (2006.01) |
| *E05D 11/00* | (2006.01) |
(Continued)

(52) U.S. Cl.
CPC .......... *B60R 16/0215* (2013.01); *B60J 5/108*
(2013.01); *B62D 33/0273* (2013.01); ***B62D
33/03* (2013.01); *E05D 5/062*** (2013.01);
*E05D 11/0081* (2013.01); *H02G 1/08*
(2013.01); *E05D 3/02* (2013.01); ***E05D
2005/067*** (2013.01)

(58) Field of Classification Search
CPC .......................... B62D 33/0273; B62D 33/03;
B60R 16/0215; E05D 11/0081; E05D
3/02; E05D 2005/067; B60J 5/108; H02G
1/08
See application file for complete search history.

(56) References Cited

U.S. PATENT DOCUMENTS

| | | | |
|---|---|---|---|
| 5,664,717 A | 9/1997 | Joder | |
| 5,761,851 A * | 6/1998 | Biddlecombe | ...... B60R 16/0215 |
| | | | 49/502 |

(Continued)

FOREIGN PATENT DOCUMENTS

| | | | |
|---|---|---|---|
| CN | 217944865 U | 12/2022 | |
| JP | 2007196925 A | 8/2007 | |
| WO | WO-2012165570 A1 * | 12/2012 | ............. H02G 11/00 |

OTHER PUBLICATIONS

Translation of WO 2012165570 (Year: 2012).*

*Primary Examiner* — Gregory A Blankenship
(74) *Attorney, Agent, or Firm* — Vichit Chea; Carlson,
Gaskey & Olds, P.C.

(57) ABSTRACT

A vehicle assembly includes a hinge and a wire shield
assembly mounted to the hinge. A method of shielding a
wire can include providing a tailgate assembly that includes
a door subassembly pivotably coupled to a frame subassem-
bly. The door subassembly and the frame subassembly can
be pivotable together between a tailgate closed position and
a tailgate open position. The method can include pivoting
the door subassembly relative to the frame subassembly to
provide a cargo bed access opening; and electrically con-
necting the door subassembly using a wire routed through a
wire shield assembly.

20 Claims, 5 Drawing Sheets

(51) Int. Cl.
  *H02G 1/08*        (2006.01)
  *E05D 3/02*        (2006.01)

(56) References Cited

U.S. PATENT DOCUMENTS

| | | | | |
|---|---|---|---|---|
| 5,897,157 | A * | 4/1999 | Yamaguchi | B60R 16/0215 |
| | | | | 296/146.7 |
| 6,350,956 | B1 * | 2/2002 | Sakata | B60R 16/0215 |
| | | | | 174/101 |
| 7,304,239 | B1 | 12/2007 | Harris et al. | |
| 7,943,854 | B1 * | 5/2011 | Lipp | H02G 11/00 |
| | | | | 174/152 G |
| 8,668,253 | B2 | 3/2014 | Bauer | |
| 11,584,203 | B2 * | 2/2023 | Nania | B60R 3/02 |
| 11,643,151 | B2 * | 5/2023 | Nania | B62D 33/0273 |
| | | | | 296/51 |
| 2002/0068486 | A1 * | 6/2002 | Kafer | B60R 16/0215 |
| | | | | 439/625 |
| 2003/0230443 | A1 | 12/2003 | Cramer et al. | |
| 2006/0001288 | A1 | 1/2006 | Thiele et al. | |
| 2014/0041899 | A1 * | 2/2014 | Inagaki | H02G 3/04 |
| | | | | 174/152 G |
| 2015/0217631 | A1 | 8/2015 | Warburton et al. | |
| 2016/0229357 | A1 * | 8/2016 | Renner | H02G 3/0608 |
| 2016/0264073 | A1 * | 9/2016 | Katou | B60R 16/0215 |
| 2017/0200197 | A1 | 7/2017 | Brubaker | |
| 2019/0283813 | A1 | 9/2019 | Smith et al. | |
| 2021/0078511 | A1 * | 3/2021 | Ledwith | B62D 33/0273 |
| 2022/0001728 | A1 * | 1/2022 | Nania | B62D 33/0273 |
| 2023/0061847 | A1 | 3/2023 | Silva | |
| 2023/0070773 | A1 | 3/2023 | Lehti | |
| 2024/0391536 | A1 * | 11/2024 | Hemphill | B62D 33/027 |
| 2024/0425000 | A1 * | 12/2024 | Lipp | H02G 1/08 |

* cited by examiner

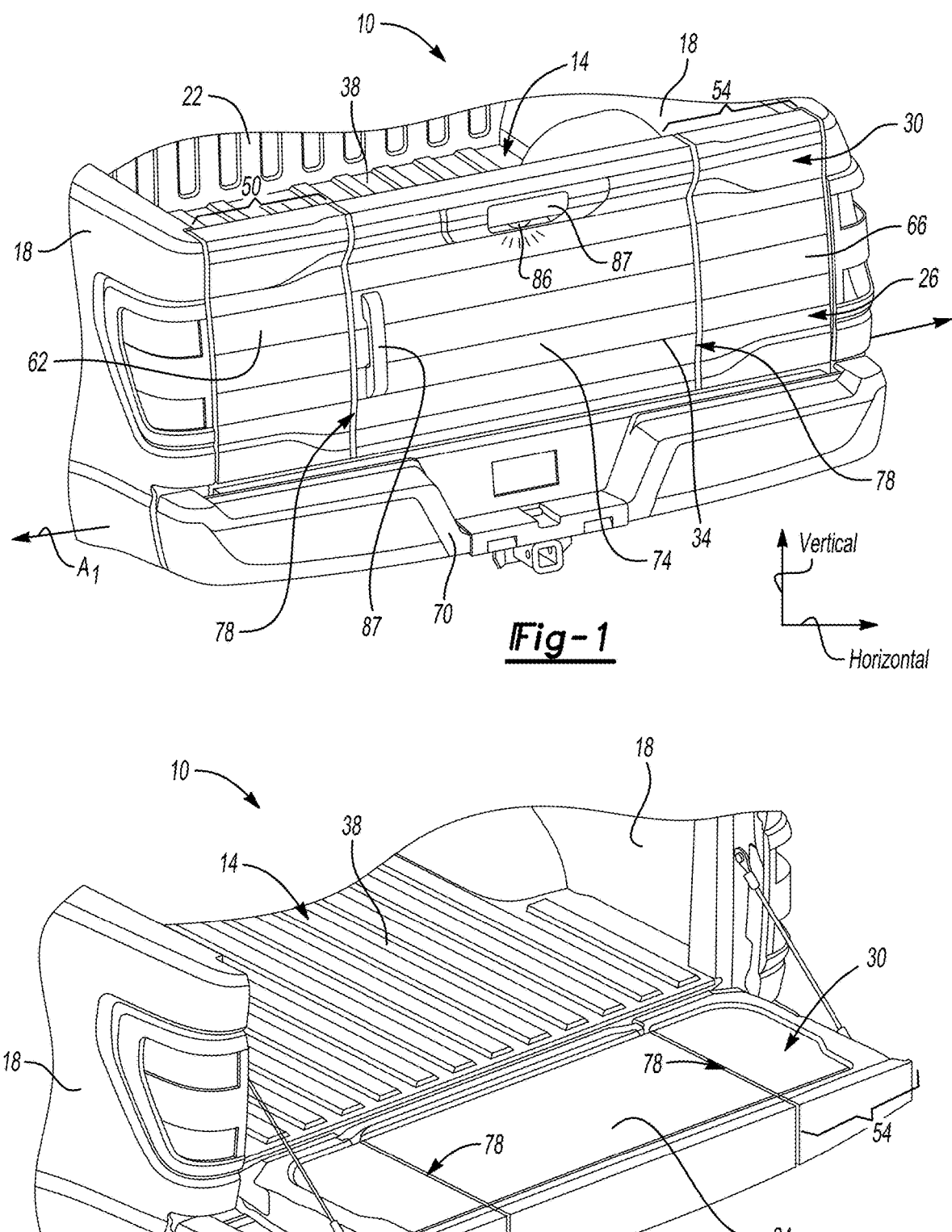
_Fig-1_
_Fig-2_

_Fig-5_
_Fig-6_

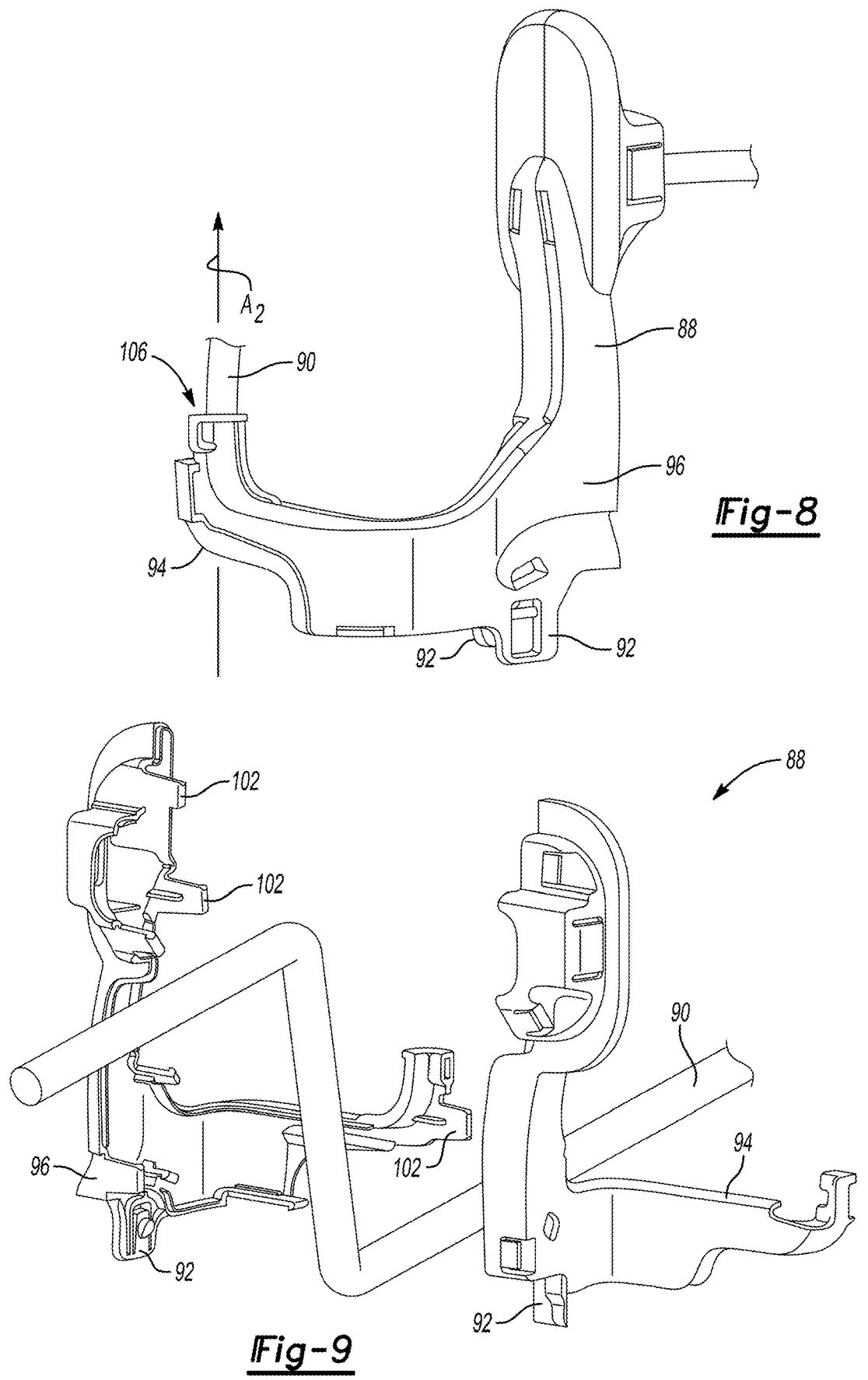
_Fig-8_
_Fig-9_

VEHICLE WIRE SHIELD ASSEMBLY

TECHNICAL FIELD

This disclosure relates generally to a wire shield assembly for a vehicle and, more particularly, to a wire shield assembly that mounts to a hinge, such as a hinge of a tailgate.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable to an open position to provide access to the cargo bed.

SUMMARY

In some aspects, the techniques described herein relate to a vehicle assembly, including: a hinge; and a wire shield assembly mounted to the hinge.

In some aspects, the techniques described herein relate to a vehicle assembly, further including a wire housed within the wire shield assembly.

In some aspects, the techniques described herein relate to a vehicle assembly, wherein the wire shield assembly includes a first piece secured to at least one second piece, the wire contained between the first piece and the at least one second piece.

In some aspects, the techniques described herein relate to a vehicle assembly, wherein the wire shield assembly is clipped to the hinge.

In some aspects, the techniques described herein relate to a vehicle assembly, wherein the hinge is a gooseneck hinge.

In some aspects, the techniques described herein relate to a vehicle assembly, wherein the wire shield assembly is a polymer-based material.

In some aspects, the techniques described herein relate to a vehicle assembly, wherein the hinge is configured to pivot a door subassembly of a tailgate about a vertically extending axis.

In some aspects, the techniques described herein relate to a vehicle assembly, further including a wire extending through an opening in the wire shield assembly to the door subassembly, the opening aligned with the vertically extending axis.

In some aspects, the techniques described herein relate to a vehicle assembly, further including: a frame subassembly of a tailgate; a door subassembly the tailgate, the door subassembly pivotably connected to the frame subassembly by the hinge; and a wire at least partially housed within the wire shield assembly, the wire extending between the frame subassembly and the door subassembly.

In some aspects, the techniques described herein relate to a vehicle assembly, wherein the hinge is a first hinge and further including a second hinge pivotably connecting the door subassembly of the tailgate to the frame subassembly.

In some aspects, the techniques described herein relate to a vehicle assembly, wherein the first hinge is vertically below the second hinge when the tailgate is in a tailgate closed position, the wire and the wire shield assembly disposed between the first hinge and the second hinge.

In some aspects, the techniques described herein relate to a vehicle assembly, further including a connecting member that connects the first hinge to the second hinge, wherein the wire shield assembly is disposed about the connecting member.

In some aspects, the techniques described herein relate to a vehicle assembly, wherein the frame subassembly includes a driver side section having a driver side outer panel, a passenger side section having a passenger side outer panel, wherein the door subassembly includes a door outer panel, the door subassembly pivotable relative to the frame subassembly back and forth between a door closed position and a door open position, the door outer panel disposed between the driver side outer panel and the passenger side outer panel when the door subassembly is in the door closed position such that the door subassembly separates the driver side outer panel from all portions of the passenger side outer panel.

In some aspects, the techniques described herein relate to a vehicle assembly, wherein the door subassembly and the frame subassembly are pivotable together about a first axis between a tailgate closed position and a tailgate open position, wherein the door subassembly is pivotable relative to the frame subassembly about a second axis between a door closed position and a door open position, the first axis transverse to the second axis.

In some aspects, the techniques described herein relate to a vehicle assembly, wherein the door subassembly in the door open position provides a cargo bed access opening that extends vertically downward at least as far as a vertically bottommost side of the driver side outer panel and the passenger side outer panel.

In some aspects, the techniques described herein relate to a vehicle assembly, wherein no portion of the door outer panel horizontally overlaps with any portion of the driver side outer panel or the passenger side outer panel.

In some aspects, the techniques described herein relate to a method of shielding a wire, including: providing a tailgate assembly that includes a door subassembly pivotably coupled to a frame subassembly, the door subassembly and the frame subassembly pivotable together between a tailgate closed position and a tailgate open position; pivoting the door subassembly relative to the frame subassembly to provide a cargo bed access opening; and electrically connecting the door subassembly using a wire routed through a wire shield assembly.

In some aspects, the techniques described herein relate to a method, further including mounting the wire shield assembly to a hinge that pivotably couples the door subassembly to the frame subassembly.

In some aspects, the techniques described herein relate to a method, further including clipping the wire shield assembly to the hinge during the connecting.

In some aspects, the techniques described herein relate to a method, further including pivoting the wire shield assembly with the hinge when pivoting the door subassembly relative to the frame subassembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 1 is a rear perspective view of a motor vehicle equipped with a cargo space and having a tailgate assembly with a door subassembly when the tailgate assembly is in a tailgate closed position relative to the cargo space.

FIG. 2 illustrates the motor vehicle of FIG. 1 with the tailgate assembly in a tailgate open position.

FIG. 5 is a perspective view of the tailgate assembly in the position of FIG. 3 looking outward from the cargo space.

FIG. 6 is a close of view of a wire shield assembly according to an exemplary aspect of the present disclosure when the wire shield assembly is mounted to a hinge of the tailgate assembly.

FIG. 8 illustrates a perspective view of the wire shield assembly of FIG. 6 along with a wire.

FIG. 9 illustrates an expanded view of the wire shield assembly and wire of FIG. 8.

DETAILED DESCRIPTION

Figure 3:
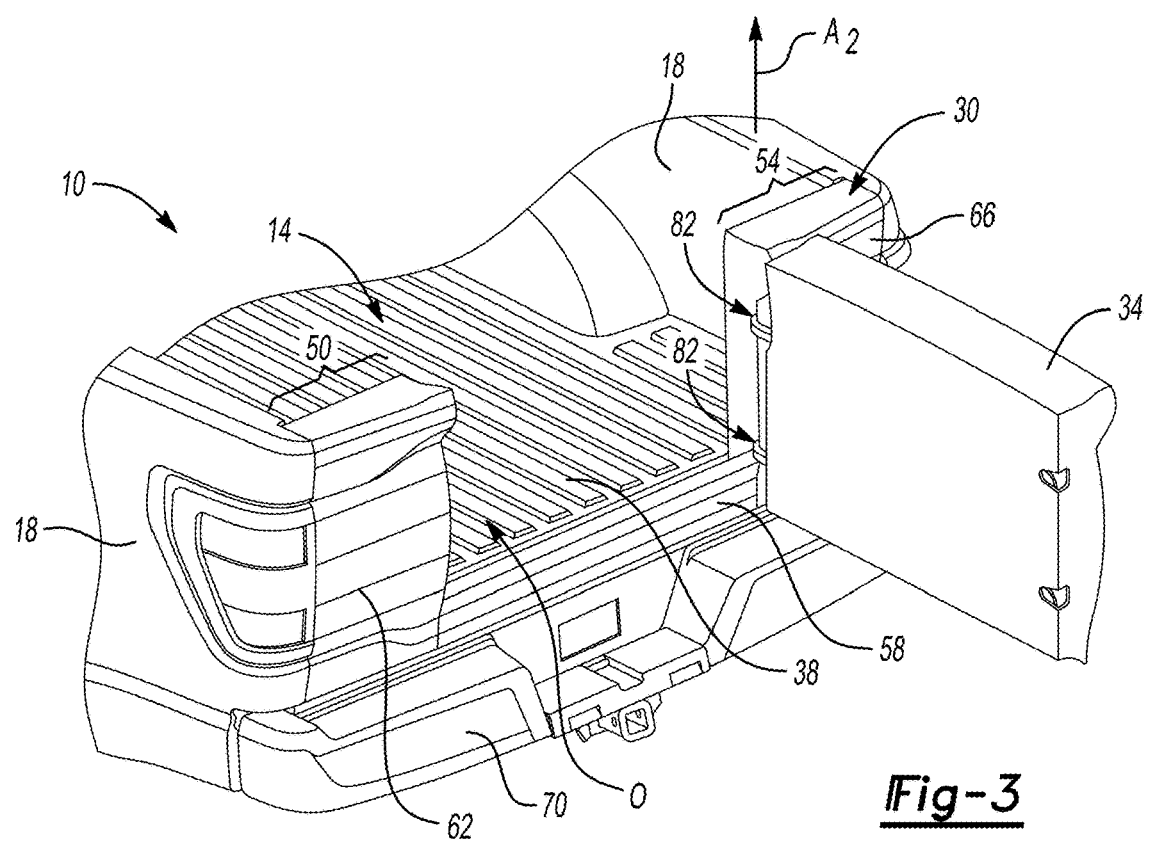
FIG. 3 illustrates the motor vehicle of FIG. 1 with the door subassembly of the tailgate assembly in a door open position.

This disclosure details an exemplary wire shield assembly for a tailgate of a vehicle. The tailgate can include a door subassembly. The door subassembly can be opened to provide an opening that helps a user to access cargo within a cargo bed, among other things.

The wire shield assembly can be used to shield a wire that extends to the door subassembly from another portion of the tailgate.

FIG. 1 illustrates a vehicle 10 according to an exemplary aspect of the present disclosure. The vehicle 10, in this example, is a pickup truck having a cargo bed 14 that is provided by a pair of sidewalls 18, a front wall 22, and a tailgate assembly 26.

The tailgate assembly 26 includes, among other things, a frame subassembly 30 and a door subassembly 34. The tailgate assembly 26 is pivotable about a first axis $A_1$ relative to the cargo bed 14 between a tailgate closed position shown in FIG. 1 and a tailgate open position shown in FIG. 2. The example tailgate assembly 26 is vertically aligned when in the tailgate closed position and horizontally aligned when in the tailgate open position. Vertical and horizontal, for purposes of this disclosure, are with reference to ground and an ordinary orientation of the vehicle 10 during operation.

The door subassembly 34 is in a door closed position and is latched to the frame subassembly 30 when the frame subassembly 30 and the door subassembly 34 are pivoted between the tailgate closed position and the tailgate open position. Thus, the frame subassembly 30 and the door subassembly 34 pivot together when the tailgate assembly 26 is pivoted between the tailgate closed position and the tailgate open position.

When the tailgate assembly 26 is in the tailgate closed position, the door subassembly 34 is pivotable relative to the frame subassembly 30 about a second axis $A_2$. The door subassembly 34 can pivot back and forth between a door closed position shown in FIG. 1 and a door open position shown in FIGS. 3 and 4. The first axis $A_1$ is a horizontally extending axis in this example. The second axis $A_2$ is transverse to the first axis $A_1$ and is a vertically extending axis in this example.

The door subassembly 34 in the door open position provides a cargo bed access opening O. In this example, the cargo bed access opening O extends vertically downward at least as far as a floor 38 of the cargo bed 14.

Figure 4:
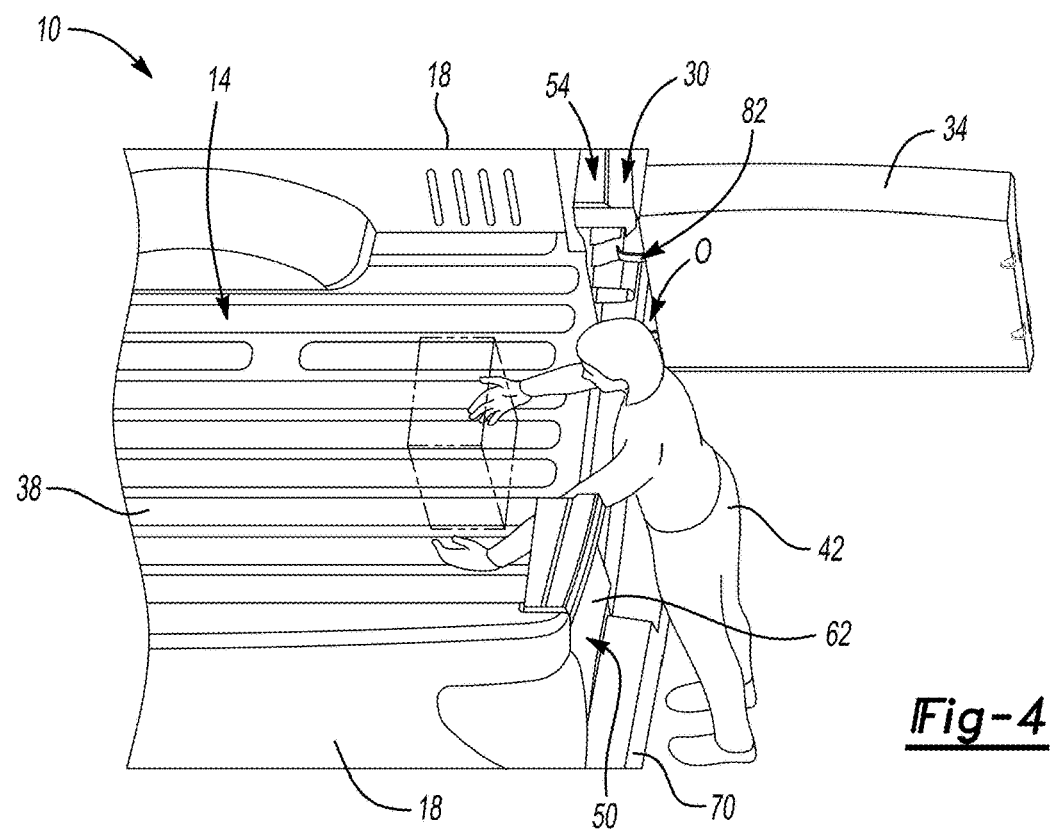
FIG. 4 is overhead view of the tailgate assembly in the position of FIG. 3.

As shown in FIG. 4, a user 42 can access the cargo bed 14 through the cargo bed access opening O provided by the door subassembly 34 in the door open position. Placing the door subassembly 34 in the door open position allows the user 42 to move closer to the cargo bed 14 than, for example, if the tailgate assembly 26 were moved to the tailgate open position of FIG. 2. The cargo bed access opening O can also provide clearance for the user 42 to enter the cargo bed 14 to retrieve cargo.

The frame subassembly 30 includes, among other things, a driver side section 50, a passenger side section 54, and a connection member 58. The driver side section 50, the passenger side section 54, and the connection member 58 pivot together when the frame subassembly 30 is moved between the tailgate closed position and the tailgate open position. A portion of the connection member 58 dips vertically downward to help the keep the connection member 58 below the floor 38 of the cargo bed 14.

The driver side section 50 includes an outer panel 62, and the passenger side section 54 includes an outer panel 66. When the tailgate assembly 26 is in the tailgate closed position of FIG. 1, the panels 62 and 66 can be viewed by an individual standing behind the vehicle 10. The connection member 58, however, is concealed from view behind a bumper 70 or a fascia for example.

The door subassembly 34 includes an outer panel 74 that is also visible to a user when the tailgate assembly 26 is in the tailgate closed position of FIG. 1. When the door subassembly 34 is in the door closed position, the outer panel 74 of the door subassembly 34 separates the outer panel 62 of the driver side section 50 from all portions of the outer panel 66 of the passenger side section 54. When the door subassembly 34 is in the door open position, the cargo bed access opening O extends vertically downward at least as far as the vertically bottommost sides of the outer panel 62 of the driver side section 50 and the outer panel 66 of the passenger side section 54.

Notably, no portion of the panel 62 or the panel 66 horizontally overlaps with the outer panel 74 of the door subassembly 34. That is, the outer panel 62 of the driver side section 50 does not include a section extending vertically beneath the panel 74 of the door subassembly 34, and the outer panel 66 of the passenger side section 54 does not include a section extending vertically beneath the outer panel 66 of the door subassembly 34. Instead, the door subassembly 34 is incorporated into the tailgate assembly 26 utilizing only two split lines 78 extending vertically across the tailgate assembly 26. Thus, the door subassembly 34 is incorporated into the tailgate assembly 26 with relatively little aesthetic disruption.

With reference now to FIGS. 5-9 and continuing reference to FIGS. 1-4, the door subassembly 34 is pivotably coupled to the frame subassembly 30 through a hinge system that includes, in this example, two hinges 82 and a connection member. The connecting member 84 links together rotation of the hinges 82.

In this example, the door subassembly 34 is pivotably coupled to the passenger side section 54. In another example, the door subassembly 34 is pivotably coupled to the driver side section 50.

The hinges 82 are gooseneck hinges in this example. The hinges 82 permit the door subassembly 34 to pivot relative to the frame subassembly 30, and to pivot well away from the cargo bed access opening O. The hinges 82 can include two door check positions, say at forty-five and ninety degrees. The door subassembly 34 can pivot one-hundred degrees when transitioned from the closed door position to a fully open door position. One of the hinges 82 is vertically above the other one of the hinges 82.

The door subassembly 34 can be electronically latched and may include one or more lights 86 and electronic handles 87. In some examples, a power drive unit can be contained within the door subassembly 34, along with a rearview camera. These and other devices can require power and data communication capability from the vehicle 10.

Thus, a wire 90 can extend to the door subassembly 34 from the frame subassembly 30. The wire 90 can extend to the frame subassembly 30 from another portion of the vehicle 10. The wire 90 electrically connects the door subassembly 34 to other portions of the vehicle 10.

The wire 90 can include multiple individual wires or strands of wires bundled together. The wire 90 can be used to provide power to the door subassembly 34 from the frame subassembly 30. The wire 90 can instead or additionally be used to communicate data to and from the door subassembly 34.

The wire 90 is routed to the door subassembly 34, which, over a life of the vehicle 10, can pivot ninety degrees or more for thousands of opening and closing cycles. To help maintain the structural integrity of the wire 90 and to maintain proper positioning of the wire 90, the tailgate assembly 26 includes a wire shield assembly 88 that housed as the wire 90.

In the exemplary embodiment, the wire shield assembly 88 is mounted to one of the hinges 82 and rotates with the hinge 82 as the door subassembly 34 is moved between the door open positions and the door closed position. That is, the hinge 82 and the wire shield assembly 88 rotate together rather than the hinge 82 rotating relative to the wire shield assembly 88. When the wire shield assembly 88 of the exemplary embodiment is mounted to the hinge 82, the wire shield assembly 88 is disposed vertically between the hinges 82.

The wire shield assembly 88 can be a polymer-based material. The wire shield assembly 88 gloves over a portion of the hinge 82 and can be molded with a plurality of clips 92 that can be used to clip the wire shield assembly 88 to the hinge 82. The wire shield assembly 88 could be attached in other ways in other examples, such as via one or more mechanical fasteners.

The wire shield assembly 88 can keep the wire 90 spaced from the hem flanges of the door subassembly 34 and the frame subassembly 30.

The wire shield assembly 88 includes, in this example, a first piece 94 and a second piece 98. In another example, additional pieces could be used. In the exemplary embodiment, the first piece 94 is secured to the second piece 98 to contain the wire 90. The first piece 94 and second piece 98 can be secured to each other via clips 102, which can be molded-in clips.

Figure 7:
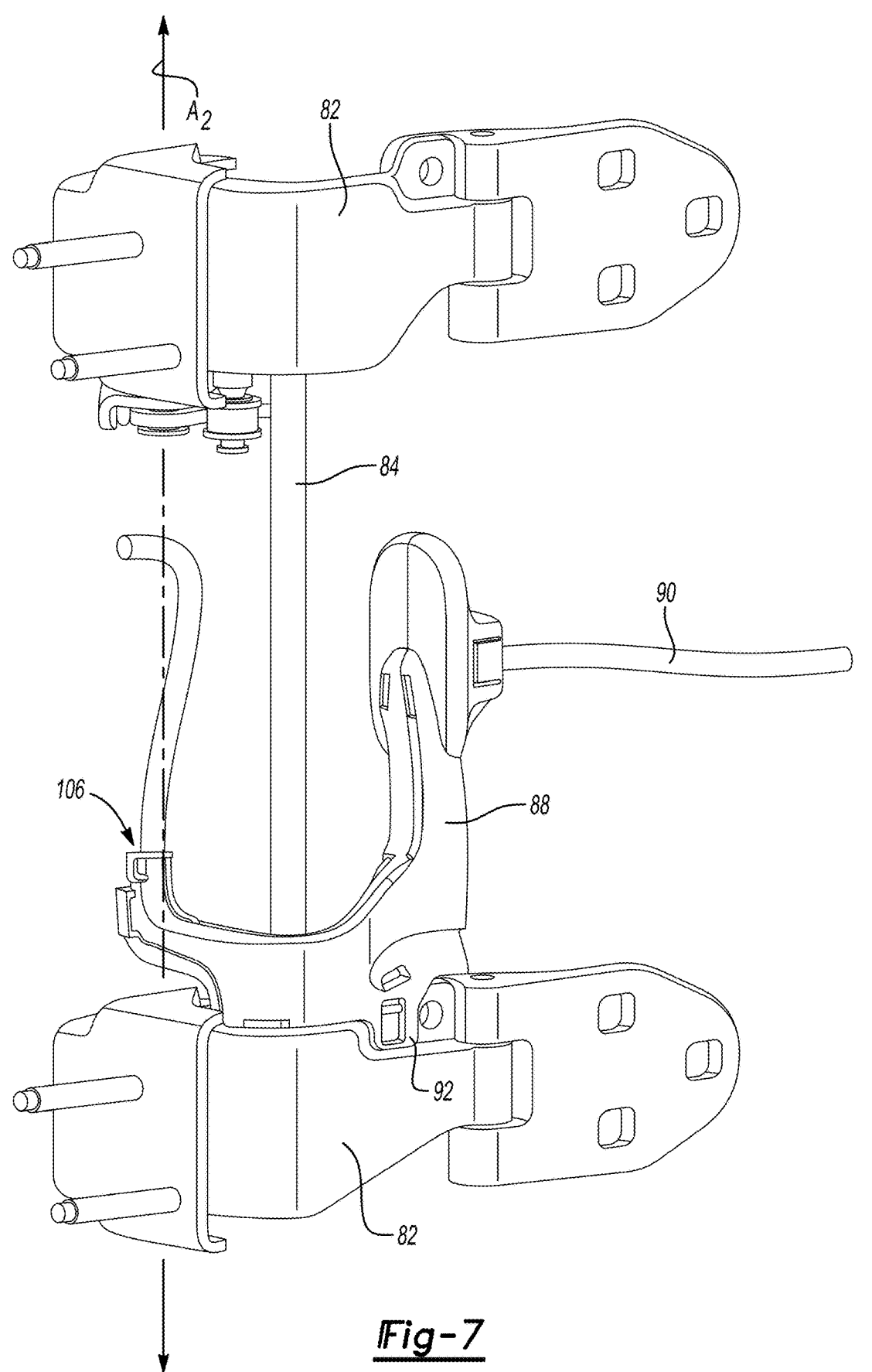
FIG. 7 illustrates a hinge system of the tailgate assembly along with the wire shield assembly of FIG. 6.

As shown in, for example, FIG. 7, the wire 90 extends through an opening 106 to the wire shield assembly 88 to the frame subassembly 30. The opening 106 is generally aligned with the axis A$_2$, which can help to reduce fatigue on the wire 90 when the door subassembly 34 is moved between the door open position and the door closed position. The wire shield assembly 88 can connect to the door subassembly 34 where the wire 90 exits the wire shield assembly 88 to the door subassembly 34.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle assembly, comprising:
   a hinge configured to pivot a door subassembly of a tailgate about a vertically extending axis relative to a frame subassembly;
   a wire shield assembly mounted to the hinge; and
   a wire having a portion housed within the wire shield assembly and a portion extending through an opening in the wire shield assembly to the frame subassembly, the vertically extending axis intersecting the opening.

2. The vehicle assembly of claim 1, wherein the wire shield assembly includes a first piece secured to at least one second piece, the wire contained between the first piece and the at least one second piece.

3. The vehicle assembly of claim 1, wherein the wire shield assembly is clipped to the hinge.

4. The vehicle assembly of claim 1, wherein the hinge is a gooseneck hinge.

5. The vehicle assembly of claim 1, wherein the wire shield assembly is a polymer-based material.

6. A vehicle assembly comprising:
   a hinge configured to pivot a door subassembly of a tailgate about a vertically extending axis;
   a wire shield assembly mounted to the hinge; and
   a wire extending through an opening in the wire shield assembly, the opening aligned with the vertically extending axis.

7. The vehicle assembly of claim 1, further comprising:
   the frame subassembly of a tailgate;
   a door subassembly the tailgate, the door subassembly pivotably connected to the frame subassembly by the hinge, wherein the wire extends from the frame subassembly through the opening to the wire shield assembly, and extends from the wire shield assembly to the door subassembly through another opening in the wire shield.

8. The vehicle assembly of claim 7, wherein the hinge is a first hinge and further comprising a second hinge pivotably connecting the door subassembly of the tailgate to the frame subassembly.

9. The vehicle assembly of claim 8, wherein the first hinge is vertically below the second hinge when the tailgate is in a tailgate closed position, the wire and the wire shield assembly disposed between the first hinge and the second hinge.

10. The vehicle assembly of claim 9, further comprising a connecting member that connects the first hinge to the second hinge, wherein the wire shield assembly is disposed about the connecting member.

11. The vehicle assembly of claim 7, wherein the frame subassembly includes a driver side section having a driver side outer panel, a passenger side section having a passenger side outer panel, wherein the door subassembly includes a door outer panel, the door subassembly pivotable relative to the frame subassembly back and forth between a door closed position and a door open position, the door outer panel disposed between the driver side outer panel and the passenger side outer panel when the door subassembly is in the door closed position such that the door subassembly separates the driver side outer panel from all portions of the passenger side outer panel.

12. The vehicle assembly of claim 11, wherein the door subassembly and the frame subassembly are pivotable together about a first axis between a tailgate closed position and a tailgate open position, wherein the door subassembly is pivotable relative to the frame subassembly about a second axis between a door closed position and a door open position, the first axis transverse to the second axis.

13. The vehicle assembly of claim 11, wherein the door subassembly in the door open position provides a cargo bed access opening that extends vertically downward at least as far as a vertically bottommost side of the driver side outer panel and the passenger side outer panel.

14. The vehicle assembly of claim 11, wherein no portion of the door outer panel horizontally overlaps with any portion of the driver side outer panel or the passenger side outer panel.

15. A method of shielding a wire, comprising:
   providing a tailgate assembly that includes a door subassembly pivotably coupled to a frame subassembly, the door subassembly and the frame subassembly pivotable together between a tailgate closed position and a tailgate open position about a pivot axis;

pivoting the door subassembly relative to the frame subassembly to provide a cargo bed access opening;
   electrically connecting the door subassembly using a wire routed through a wire shield assembly; and
   routing the wire such that the wire extends from the frame assembly through an opening in the wire shield assembly that is aligned with the pivot axis.

16. The method of claim 15, further comprising mounting the wire shield assembly to a hinge that pivotably couples the door subassembly to the frame subassembly.

17. The method of claim 16, further comprising clipping the wire shield assembly to the hinge during the connecting.

18. The method of claim 16, further comprising pivoting the wire shield assembly with the hinge when pivoting the door subassembly relative to the frame subassembly.

19. The vehicle assembly of claim 7, wherein the wire shield assembly is connected directly to the door subassembly where the wire exits the wire shield assembly to the door subassembly such that the wire is not exposed between the wire shield assembly and the door subassembly.

20. The method of claim 16, wherein the wire shield assembly is connected directly to the door subassembly where the wire exits the wire shield assembly to the door subassembly.

* * * * *